United States Patent Office 3,448,116
Patented June 3, 1969

3,448,116
PREPARATION OF 1-HYDROXYHYDANTOINS
AND 1-HYDROXYTHIOHYDANTOINS
Ronald J. McCaully, Malvern, Stanley C. Bell, Philadelphia, and Peter B. Russell, Villanova, Pa., assignors to American Home Products Corporation, New York, N.Y., a corporation of Delaware
No Drawing. Filed Apr. 25, 1966, Ser. No. 544,813
Int. Cl. C07d 49/32
U.S. Cl. 260—309.5                           8 Claims

ABSTRACT OF THE DISCLOSURE 1-hydroxyhydantoin and 1-hydroxythiohydantoins may be prepared by the condensation of a phenyl isocyanate with N-hydroxyaminoacetic acid, cyclizing the adduct with a mineral acid and then acylating the resulting product. The products have known pharmaceutical properties which render them useful as synthetic medicinals, such as anticonvulsants.

This invention relates to a process for the preparation of hydantoins. More particularly, this invention relates to a new and improved method of preparing hydroxyhydantoins and hydroxythiohydantoins which have therapeutic activity.

The process of the present invention in its principal aspect involves the condensation of a phenylisocyanate with N-hydroxyaminoacetic acid to form a phenylhydroxyhydantoic acid, cyclizing said phenylhydroxyhydantoic acid by treatment with a mineral acid to form a phenylhydroxyhydantoin and then acylating said phenylhydroxyhydantoin. Examples of compounds prepared by this process includes: 3-(p-chlorophenyl)-1-hydroxyhydantoin; 3-(p-chlorophenyl)-1-hydroxyhydantoin, acetate; 1-hydroxy-3-phenylthiohydantoin and 1-hydroxy-3-phenylthiohydantoin, acetate.

The process of the present invention may be more specifically illustrated by the following sequence of reactions:

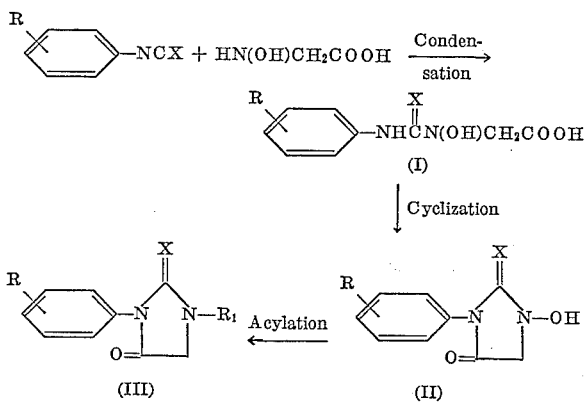

wherein R is selected from the group consisting of hydrogen, benzoyl, trifluoromethyl, nitro, halogen, lower alkyl and lower alkoxy; $R_1$ is lower alkanoyloxy and X is selected from the group consisting of oxygen and sulfur. The reaction is generally effected by admixing N-hydroxyaminoacetic acid with a slight molar excess of an appropriate phenylisocyanate in a reaction-inert organic solvent. When the exothermic reaction ceases, the reaction mixture may be stirred for a period of about one to about sixteen hours at a temperature from 25° C. to 50° C. Thereafter, the precipitated phenylhydroxyhydantoic acid (I) is separated by filtration.

The above prepared phenylhydroxyhydantoic acid (I) is then cyclized by admixture with a mineral acid. The dissolution of the reactants and cyclization reaction may be enhanced by heating the reaction mixture at a temperature from about 80° C. to about 175° C. for a period of from about five minutes to about five hours. After the reaction is complete, the precipitated phenylhydroxyhydantoin (II) is separated by conventional recovery procedures, such as, filtration and crystallization.

When it is desired to prepare the acylated derivatives (III) of the aforesaid phenylhydroxyhydantoins (II), a phenylhydroxyhydantoin is admixed with an appropriate acylating agent, e.g. acetic anhydride, propionic anhydride, valeric anhydride and acetyl chloride, and the reaction mixture is heated at steam bath temperatures for a period of about 5 minutes to about three hours. When the acylation is complete, the phenylhydroxyhydantoin acylate (III) is recovered by standard methods such as concentration and crystallization.

The majority of the reactants employed in the process of this invention are known compounds which are readily available from commercial sources, while the remainder can be prepared in accordance with standard organic procedures well known to those skilled in the art.

By reaction-inert organic solvent, as employed above, is meant an organic liquid which will dissolve the reactants and not react with them. Although other solvents may be employed, as will suggest themselves to those skilled in the art, suitable solvents are 1,2-dimethoxyethane, tetrahydrofuran, dioxane, ether, chloroform and dichloromethane. The amount of solvent used is not critical, it being only necessary to use sufficient solvent to provide a reaction medium for the reactants. The term "mineral acid," as employed above, includes all inorganic acids and is exemplified by the following: hydrochloric acid, hydrobromic acid, hydroiodic acid, sulfuric acid and phosphoric acid. The time and temperature ranges utilized in the aforesaid reactions are not critical and simply represent the most convenient ranges consistent with carrying out the reactions in a minimum of time without undue difficulty. Reaction temperatures appreciably below the demonstrated ranges can be used, but their use considerably extends the reaction time. Similarly, in some cases, temperatures higher than those mentioned can be employed with a proportionate decrease in reaction time.

The phenylhydroxyhydantoins (II) and their acylated derivatives (III) as prepared by the process of this invention have known pharmaceutical properties which render them useful as synthetic medicinals. More particularly, these compounds have demonstrated anticonvulsant activity.

The compounds of this invention may be administered alone or in combination with pharmaceutically acceptable carriers, the proportion of which is determined by the solubility and chemical nature of the compound, chosen route of administration and standard pharmaceutical practice. For example, they may be administered orally in the form of tablets or capsules containing such excipients as starch, milk sugar, certain types of clay and so forth. They may be administered sublingually in the form of troches or lozenges in which the active ingredient is mixed with sugar and corn syrups, flavoring agents and dyes; and then dehydrated sufficiently to make it suitable for pressing into a solid form. They may be administered orally in the form of solutions which may contain coloring and flavoring agents or they may be injected parenterally, that is intramuscularly, intravenously or subcutaneously. For parenteral administration they may be used in the form of a sterile solution containing other solutes, for example, enough saline or glucose to make the solution isotonic.

The dosage of the present therapeutic agents will vary with the form of administration and the particular compound chosen. Furthermore, it will vary with the particular subject under treatment. Generally, treatment is initiated with small dosages substantially less than the optimum dose of the compound. Thereafter, the dosage is increased by small increments until the optimum effect under the circumstances is reached. It will generally be found that when the composition is administered orally, larger quantities of the active agent will be required to produce the same effect as a smaller quantity given parenterally. In general, the compounds of this invention are most desirably administered at a concentration level that will generally afford effective results without causing any harmful or deleterious side effects and preferably at a level that is in the range of from about 10 mg. to about 400 mg. per day, although as aforementioned variations will occur. However, a dosage level that is in the range of from about 20 mg. to about 100 mg. per day is most desirably employed in order to achieve effective results.

The following examples are given by way of illustration and are not to be construed as limitations of this invention, many variations of which are possible without departing from the scope and spirit thereof.

Example I

A slurry of N-hydroxyaminoacetic acid (13.67 g., 0.141 mole) in 40 ml. of dry 1,2-dimethoxyethane is stirred and treated gradually with a solution of 23.1 g. (0.171 mole) of p-chlorophenylisocyanate in 20 ml. of dry 1,2-dimethoxyethane. After the exothermic reaction ceases, the mixture is stirred at 28° C. for 1.5 hours. Filtration of crystalline material gives 24.37 g. (71%) of 5-(p-chlorophenyl)-3-hydroxyhydantoic acid, M.P. 156.5–157° C.

5-(p-chlorophenyl)-3-hydroxyhydantoic acid (5.00 g., 20.4 mmole) is slurried in 100 ml. of 6 N hydrochloric acid. The mixture is heated with stirring in an oil bath (bath temperature, 150° C.) for 30 minutes whereupon most of the starting material dissolves and the product begins to separate as needles. The solution is gradually allowed to cool to room temperature and the 2.5 g. (54%) crystalline product is collected. The product is recrystallized in acetonitrile to give 3-(p-chlorophenyl)-1-hydroxyhydantoin, M.P. 167–169° C.

Analysis.—Calcd. for $C_9H_7N_2O_3Cl$: C, 47.70; H, 3.11; N, 12.36; Cl, 15.64. Found: C, 47.33; H, 3.27; N, 12.21; Cl, 15.9.

A slurry of 100 mg. (0.441 mmole) 3-(p-chlorophenyl)-1-hydroxyhydantoin in 6 ml. of acetic anhydride is warmed for 10 minutes on a steam bath until all the solid dissolves. The excess acetic anhydride is then evaporated on a rotary evaporator to give a colorless oil. Treatment of the oil with isopropyl alcohol yields 95 mg. (80%) of 3-(p-chlorophenyl)-1-hydroxyhydantoin, acetate, M.P. 116–118° C., as colorless crystals.

Similarly, 3-(p-trifluoromethylphenyl)-1-hydroxyhydantoin, acetate is prepared.

Example II

A slurry of N-hydroxyaminoacetic acid (0.140 mole) in 40 ml. of dioxane is stirred and treated gradually with a solution of p-tolylisocyanate (0.17 mole) in 20 ml. of dioxane. When the exothermic reaction ceases, the mixture is stirred at 50° C. for one hour. Filtration of crystalline material yields 3-hydroxy-5-(p-tolyl)hydantoic acid.

The above prepared 3-hydroxy-5-(p-tolyl)hydantoic acid (20 mmole) is slurried in 100 ml. of 5 N sulfuric acid and heated with stirring to 80° C. for one hour. Thereafter, the precipitated product is collected by filtration and recrystallized from ethanol to yield 1-hydroxy-3-(p-tolyl)hydantoin.

In the same manner, 3-(p-ethylphenyl)-1-hydroxyhydantoin is obtained.

Example III

A slurry of 200 mg. of 1-hydroxy-3-(p-tolyl)hydantoin, as prepared in Example II, in 12 ml. of acetic anhydride is heated for one hour at 75° C. When the reaction is complete, the excess acetic anhydride is removed under vacuum, and the residue is treated with methanol to yield 1-hydroxy-3-(p-tolyl)hydantoin, acetate.

Similarly, the acetate of 3-(p-ethylphenyl)-1-hydroxyhydantoin is produced.

Example IV

To a slurry of 9.10 g. (0.1 mole) of N-hydroxyaminoacetic acid in 75 ml. of dry 1,2-dimethoxyethane, there is added dropwise a solution of 13.52 g. (0.1 mole) of phenylisothiocyanate in 20 ml. of 1,2-dimethoxyethane. After the mixture is warmed to 55° C. for 4 hours, the unreacted hydroxyaminoacetic acid (5.83 g.) is filtered from the solution and the filtrate evaporated to a crystalline residue. Filtration of the residue suspended in ether yields 3.37 g. (42% based on hydroxyaminoacetic acid) of 3-hydroxy-5-phenyl-4-thiohydantoic acid, M.P. 130–131° C.

Analysis.—Calcd. for $C_9H_{10}N_2O_3S$: C, 47.79; H, 4.46; N, 12.39. Found: C, 48.16; H, 4.41; N, 12.24.

3-hydroxy-5-phenyl-4-thiohydantoic acid (3.80 g., 0.0168 mole) is added rapidly to 50 ml. of 6 N hydrochloric acid and heated in an oil bath at 130° C. The mixture is heated for ten minutes and then allowed to cool to room temperature. Filtration of the colorless needles yields 3.06 g. (87%) of 1-hydroxy-3-phenylthiohydantoin, M.P. 208–209° C.

Analysis.—Calcd. for $C_9H_8N_2O_2S$: C, 51.92; H, 3.87; N, 13.46. Found: C, 51.97; H, 3,91; N, 13.29.

1-hydroxy-3-phenylthiohydantoin (12.6 g., 60.5 mmole) slurried in 160 ml. of dry 1,2-dimethoxyethane is treated gradually with a solution of 5.04 g. (64.1 mmole) of acetylchloride. The mixture is stirred at 50–60° C. for two and a half hours. The solvent and excess reagent are then evaporated in vacuo, the yellow crystalline residue slurried in ether and filtered to give 10.92 g. of crude product, M.P. 156–159° C. The material is recrystallized from methylene chloride-cyclohexane to give 1-hydroxy-3-phenylthiohydantoin, acetate.

Example V

To a slurry of (0.1 mole) of N-hydroxyaminoacetic acid in 75 ml. of tetrahydrofuran, there is added a solution of (p-nitrophenyl)-isothiocyanate (0.1 mole) in 20 ml. of tetrahydrofuran. After the mixture is warmed to 40° C. for ten hours the reaction mixture is filtered. The filtrate is evaporated and the residue is 3-hydroxy-5-(p-nitrophenyl)-4-thiohydantoic acid. Addition of this product (0.02 mole) to 100 ml. of 4 N phosphoric acid at 100° C. produces a precipitate of 1-hydroxy-3-(p-nitrophenyl)thiohydantoin which is separated by filtration.

When 1-hydroxy-3-(p-nitrophenyl)thiohydantoin is reacted with propionic anhydride by the aforesaid described acylating procedures, the corresponding propionate is obtained.

Example VI

Employing the procedure, as described in the previous examples, to react N-hydroxyaminoacetic acid with an appropriate phenylisocyanate, the phenylhydroxyhydantoic acids hereinafter listed are obtained. Treatment of these phenylhydroxyhydantoic acids with a mineral acid produces the corresponding hydroxyphenylhydantoins which are subsequently acylated to the following hydroxyphenylhydantoin acylates.

Phenylhydroxyhydantoic acids 5-(p-bromophenyl)-3-hydroxy-4-thiohydantoic acid.
3-hydroxy-5-(m-iodophenyl)-hydantoic acid.
3-hydroxy-5-(p-methoxyphenyl)-4-thiohydantoic acid.
3-hydroxy-5-(p-propoxyphenyl)-hydantoic acid.
5-(2-benzoyl-4-chlorophenyl)-3-hydroxyhydantoic acid.

Hydroxyphenylhydantoin acylates 3-(p-bromophenyl)-1-hydroxythiohydantoin, butyrate.
1-hydroxy-3-(m-iodophenyl)-hydantoin, acetate.
1-hydroxy-3-(p-methoxyphenyl)thiohydantoin, propionate.
1-hydroxy-3-(p-propoxyphenyl)hydantoin, acetate.
3-(2-benzoyl-4-chlorophenyl)-1-hydroxyhydantoin, acetate.

Example VII

A slurry of 18.2 g. (0.2 mole) of N-hydroxyaminoacetic acid in 25 ml. of water is treated with 50 ml. of 4 N sodium hydroxide and a solution of 27.2 g. (0.2 mole) of phenylisothiocyanate in 100 ml. of ethanol. The resultant solution is allowed to stand for one hour at 50° C. and then allowed to slowly cool to room temperature. The reaction mixture is treated with four 25-ml. portions of conc. hydrochloric acid and the warm solution is allowed to cool overnight. Filtration of the crystalline material gives 25.6 g. of 1-hydroxy-3-phenyl-2-thiohydantion, M.P. 208–209° C. dec.

What is claimed is:
1. A process for the production of a 3-phenyl-1-hydroxyhydantoin which comprises:
   (a) condensing a phenylisocyanate with N-hydroxyaminoacetic acid to form a phenylhydroxyhydantoic acid; and
   (b) cyclizing said phenylhydroxyhydantoic acid by treatment with a mineral acid to form a 3-phenyl-1-hydroxyhydantoin.
2. A process as described in claim 1 which comprises, in addition, contacting said phenyl-1-hydroxyhydantoin with a lower alkanoyl acylating agent.
3. A process as described in claim 1 for the production of 3-(p-chlorophenyl)-1-hydroxyhydantoin which comprises:
   (a) condensing (p-chlorophenyl)-isocyanate with N-hydroxyaminoacetic acid to form 5-(p-chlorophenyl)-3-hydroxyhydantoic acid; and
   (b) cyclizing said 5-(p-chlorophenyl)-3-hydroxyhydantoic acid by treatment with hydrochloric acid to form 3-(p-chlorophenyl)-1-hydroxyhydantoin.
4. A process as described in claim 3 wherein the 3-(p-chlorophenyl)-1-hydroxyhydantoin is acylated with acetic anhydride to form 3-(p-chlorophenyl)-1-hydroxyhydantoin, acetate.
5. A process as described in claim 1 for the production of 1-hydroxy-3-phenyl-2-thiohydantoin which comprises:
   (a) condensing phenylisothiocyanate with N-hydroxyaminoacetic acid to form 3-hydroxy-5-phenyl-4-thiohydantoic acid; and
   (b) cyclizing said 3-hydroxy-5-phenyl-4-thiohydantoic acid by treatment with hydrochloric acid to form 1-hydroxy-3-phenyl-2-thiohydantoin.
6. A process as described in claim 5 wherein the 1-hydroxy-3-phenyl-2-thiohydantoin is acylated with acetyl chloride to form 1-hydroxy-3-phenyl-2-thiohydantoin, acetate.
7. A process for the production of a hydroxyhydantoin of the formula:

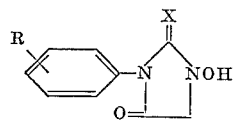

wherein R is selected from the group consisting of hydrogen, trifluoromethyl, nitro, halogen, lower alkyl benzoyl and lower alkoxy; and X is selected from the group consisting of oxygen and sulfur, which comprises:
   (a) condensing a phenylisothiocyanate of the formula:

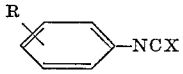

wherein R and X are defined above with N-hydroxyaminoacetic acid to form the corresponding phenylhydroxyhydantoic acid of the formula:

wherein R and X are defined as above; and then
   (b) cyclizing said phenylhydroxyhydantoic acid by treatment with a mineral acid.
8. A process as described in claim 7 which comprises, in addition, the acylation of said phenylhydroxydantoin to form a compound of the formula:

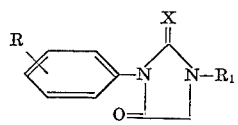

wherein R is selected from the group consisting of hydrogen, benzoyl, trifluoromethyl, nitro, halogen, lower alkyl and lower alkoxy; $R_1$ is lower alkanoyloxy and X is selected from the group consisting of oxygen and sulfur.

References Cited

UNITED STATES PATENTS 2,942,004   6/1960   Cave _____ 260—309.5

OTHER REFERENCES

Dains et al., Jour. Amer. Chem. Soc., vol. 44, pp. 2310–12 relied on (1922).
Mouneyrat, Berichte, vol. 33, pp. 2393–6 (1900).
Noller, Chemistry of Organic Compounds, 2nd ed. pp. 161, 163, and 165, Philadelphia, Saunders, 1957.
Shirai et al., Chem. Abst., vol. 57, column 16592 (1962).
Siefken et al., German application 1,039,302, March 1959, 3 pages.
Ware, Chem. Rev., vol. 46, pp. 406–14 (1950).

NORMA S. MILESTONE, *Primary Examiner.*
NATALIE TROUSOF, *Assistant Examiner.*

U.S. Cl. X.R.
260—516, 518, 999